United States Patent Office 3,586,622
Patented June 22, 1971

---

3,586,622
SWEETENING PETROLEUM DISTILLATES WITH HUMIC ACID SALTS
Ralph B. Thompson, Oak Brook, Ill., assignor to Howe-Baker Engineers, Inc., Tyler, Tex.
No Drawing. Continuation of application Ser. No. 658,031, Aug. 3, 1967. This application Jan. 5, 1970, Ser. No. 503
Int. Cl. C10g *19/02, 27/06, 29/14*
U.S. Cl. 208—204
4 Claims

ABSTRACT OF THE DISCLOSURE

Catalyzed aqueous alkaline solutions are utilized in an oxidative treatment of sour petroleum distillates. The catalyst in solution is a heavy metal salt of humic acid with a preferred specie being cobalt humate. Mercaptans contained in aqueous caustic solutions are oxidized in the presence of said humic acid salt to form disulfides which are then easily separated from caustic solutions, thereby allowing for reuse of the caustic solutions in treating additional petroleum distillates. The humic acid used in forming said salts may be derived from leonardite.

---

This application is a continuation of application Ser. No. 658,031, filed Aug. 3, 1967, now abandoned.

INTRODUCTION

The caustic washing of sour petroleum distillates in the presence of an oxidizing agent such as air to remove mercaptans has been practiced by the petroleum refining art for many years. An improved process for caustic treating of sour petroleum distillates resides in the use of aqueous caustic solutions either alone or in combination with solutizers in the presence of certain catalytic agents which may be described as heavy metal complexes of modified phthalocyanines. These catalytic solutions not only improve mercaptan extraction, but allow the caustic solutions to be oxidized to free them from mercaptans by the expediency of converting the mercaptans to the corresponding disulfides which are insoluble in such solutions. The insoluble disulfides are then removed from the catalyst containing caustic solutions and used for the further processing of sour hydrocarbon distillates.

The present invention, as indicated, furnishes to the art an improved catalytic agent for utilization in such processes. The use of phthalocyanine type catalysts to improve the regeneration efficiency of air oxidation of mercaptan containing caustic solutions as well as the use of such catalysts containing solutions to treat sour distillates, is broadly described in U.S. 2,882,244 and U.S. 2,853,432.

The processes described in the above two patents require the use of expensive, difficultly synthesized phthalocyanine compounds. To be effective as catalytic agents for treating caustic solutions containing mercaptans which are oxidized to provide insoluble disulfides, it is beneficial that the catalytic agent be soluble in the caustic solution. To achieve this objective, it is customary to prepare the sulfonate derivatives of phthalocyanines in order to render them soluble. This sulfonation, combined with the basic cost of phthalocyanine compounds per se, renders the production of such materials extremely costly.

It would be obviously be of benefit to the art if a caustic soluble catalytic agent were available which was inexpensive and which was extremely effective in improving the oxidation characteristics of mercaptan containing caustic solutions and yet, at the same time, was of such a nature that it would not release undesirable contaminating agents to petroleum process streams.

OBJECTS OF THE INVENTION

It, therefore, becomes an object of the invention to provide an improved catalytic agent useful in improving the oxidation of mercaptan containing caustic solutions whereby mercaptan values thereof are converted to insoluble disulfides which are later removed from the solutions.

A further object of the invention is to provide a caustic treating solution which contains a catalytic agent which is useful in treating a wide variety of sour petroleum distillates whereby the mercaptan content may be substantially reduced by an oxidation reaction. Other objects will appear hereinafter.

THE INVENTION

As indicated, this invention is directed to improved catalyst compositions for utilization in processes of the type described in U.S. 2,882,224 and U.S. 2,853,432, the disclosures of which are incorporated herein by reference.

By using the techniques set forth in the above U.S. patents, it is possible to treat a variety of petroleum hydrocarbon liquids such as sour gasolines which include cracked and straight run gasolines, kerosenes, naphthas, jet fuels, aromatic solvents, stove oils, range oils, fuel oils, and the like, whereby their mercaptan content may be substantially reduced.

These treatments are accomplished by caustic washing of the stocks with aqueous caustic solutions which contain from about 5 to 50% by weight of an alkali metal hydroxide such as sodium or potassium hydroxide. The most conveniently used caustic of this group is potassium hydroxide.

To improve the sweetening effects achieved with alkali scrubbing of sour distillates of the type described, it is desirable to include therewith from about 5 to about 200 volume percent by weight of caustic solution of solutizers illustrated by the well-known water soluble or dispersible compounds such as water-miscible organic carboxylic acid salts, carboxylic acids, water-miscible alcohols, e.g. methanol, ethanol and isopropanol, ketones, aldehydes, esters, phenols and tannins.

The sweetening of the various distillates previously mentioned may be accomplished over temperatures ranging from ambient to within the range of about 100° to 400° F.

The amount of catalyst used to improve the overall efficiency of mercaptan removal range from as little as 5 to as much as 500 p.p.m. with 10 to 100 p.p.m. giving adequate results in most cases.

In sweetening with alkaline reagents in accordance with the teachings of the above-described U.S. patents, it is necessary that an oxidant be introduced during the treatment steps to improve mercaptan removal as well as to convert the mercaptans to disulfides which are substantially soluble in aqueous alkaline treating solutions. The most preferred oxidant is air, which is convenient and readily available. Other materials, such as oxidizing salts and the like, may be used but they are not practical in most refinery operations.

One of the most important concepts of the invention resides in the fact that by utilizing caustic solutions which contain extracted mercaptans taken from petroleum hydrocarbon liquids, the presence of the catalyst allow these mercaptans to be readily oxidized by air to disulfides. These disulfides form a top layer in the caustic solution and may be readily removed.

This conversion of mercaptans to disulfides by using the catalyst of the invention in combination with caustic washing-air oxidation of petroleum stocks and the air oxidation of alkaline solutions which contain mercaptans it is possible to effectively provide to the petroleum industry with improved sweetening processes.

THE CATALYSTS OF THE INVENTION

The catalysts of the invention comprise the heavy metal salts of humic acids. A preferred group of heavy metals used to prepare the salts are those of Group VIII of the Periodic Table of the Elements which include such metals as: iron, cobalt, nickel, ruthenium, rhodium, palladium, osmium, iridium and platinum. Also useful metals used as their humic acid salts are zinc, copper, bismuth, lead, barium, magnesium, calcium and strontium. The most preferred catalyst from the standpoint of ease of preparation, cost and efficiency of operation is cobalt humate.

Humic acid, which is a generic term for the acid derived from humus or the top layer of soil, containing organic composition products of vegetation comprises the starting material for preparing the catalyst of the invention.

Sources of the humic acid may be from peat, brown coal, lignite, and the like. Of course, the invention contemplates salts prepared from the above raw materials containing varying amounts of humic acid. In fact, it is preferred that the impure or just mined material be used as a starting reagent due to low cost, availability, and lack of need for costly processing prior to salt formation.

One of the preferred sources of humic acid is leonardite, often found in association with lignite. This is a specific organic substance named after A. G. Leonard who was associated with its discovery. It is considered to be more in the nature of a chemical useful in various additive processes rather than as a fuel, due to its relatively poor combustibility and low B.t.u. content per unit weight. Leonardite is primarily mined from the Harmon bed in Bowman, County, N. Dak., and Divide County, N. Dak., and in and around Alpine, Tex. Although physically similar to lignite, leonardite has a much richer oxygen content that does lignite, ranging in oxygen content from 27–33% by weight, whereas lignite contains about 19–20% oxygen by weight. The high oxygen content of leonardite is ascribed to the presence of carboxylic acid and phenolic groups in the leonardite molecule. Spectral analysis has indicated that leonardite is generically speaking a mixture of humic acids and salts thereof which upon excitation for such analysis, causes certain distinctive spectral patterns to appear. Although not proved conclusively, leonardite is probably a large condensed ring polymeric molecule containing carboxyl groups. The following structural formula has been proposed as a representative-type molecule defining leonardite. This formula, of course, is not meant to be conclusive but has been tendered in order to show the complex problems in defining such sources of humic acid as leonardite, and other humic acid-containing materials. Reference to their mining source is often the most convenient route to precise definition.

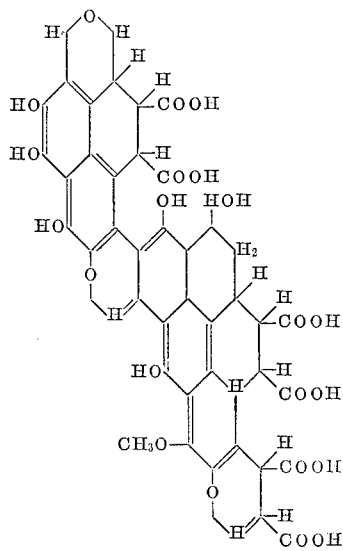

A typical leonardite sample normally said to be comprised of calcium, sodium, magnesium, potassium, etc., salts of complex organic acid and free organic acid is partially analyzed as follows: Ash, 14.01; C, 48.75–53.98; H, 3.79–4.70; N, 1.25; O, 31.99; $CH_3$, 1.26; $CH_3O$, 0.44; $CH_3CO$, 0.38.

The equivalent weight of the above sample of leonardite was determined to be 256.

Humic acids, particularly leonardite as mined, contains a number of impurities which are desirably removed to provide a more active source of humic acid for the practice of the invention. These impurities are mainly iron, iron oxide and silica and certain alkaline earth metal salts. To remove these undesirable impurities from the source of humic acid, an acid washing technique may be employed. To illustrate this acid washing technique, Example I is presented below.

Example I

This example illustrates the preparation of about 2 pounds of acid-washed humic acid. 3,000 grams of leonardite was spread on a plastic sheet and allowed to air dry overnight. The material was then pulverized by a ball mill to produce a fine powder. After this mechanical preparation of the material, a 20-liter round bottom flask fitted with a stirrer, heater and reflux condenser was used. Into this flask, which contained 10 liters of water, was added 2,250 grams of the pulverized material. To this was added 350 milliliters of concentrated hydrochloric acid. The stirrer was started and the entire reaction mass heated to reflux temperature. Refluxing was allowed to continue for about 16 hours, at which time the heat was turned off and the material separated by filtration. The finely powdered demetallized humic acid was washed with hot water until the wash water was negative to the chloride test.

To further allow a ready preparation of the heavy metal salts of humic acid, it is desirable that the humic acid treated above be further conditioned by what may be considered a neutralization and purification step. This converts the humic acid into a water-soluble alkaline form and allows it to be readily converted into the cobalt salt. To illustrate this neutralization and purification step, the following is presented.

Example II

The neutralization was done in an open-mouth laboratory beaker filled with a "lightening" mixer. A conventional pH meter was used to monitor the reaction. The quantity of the demetallized humic acid as prepared in accordance with Example I, approximately 2200 grams was slowly added to 8 liters of water. To this was then added dilute solution of sodium hydroxide to bring the pH of the solution to 7. Good mixing was maintained throughout these additions. At this point, small additional amounts of the sodium hydroxide solution were added until the pH was in the range of approximately 8.5.

After this addition, stirring was still continued without heat to allow the pH to reach an equilibrium. (If the pH tends to increase, additional amounts of humic acid may be added to control the pH where it is about 8.5.) After this pH equilibrium was reached, the material was allowed to stand quietly for 24 hours to make sure that a complete equilibrium state had been reached.

After this standing period, the supernatant liquid was withdrawn from the insoluble residue at the bottom and represents the solubilized alkaline humic acid. The liquid was analyzed for sodium content which gave an indication of the amount of metal salt which was to be reacted therewith to form the heavy metal humate which is used in the practice of the invention.

Using the alkaline purified solution described above the following indicates a typical preparation of how a preferred material, cobalt humate, is prepared.

Example III

This particular example illustrates the preparation of cobalt humate with cobalt sulfate. Simple modification can be made using other starting inorganic salts of the heavy metals.

It is important in preparing cobalt humate from cobalt sulfate that the molar ratio of sodium in the sodium humate to cobalt be 4. Once the molar concentration of sodium has been determined as in this example, the volume of sodium humate, the amount of cobalt sulfate—7H$_2$O required is calculated as follows:

$$\frac{V \times M \times 281}{4}$$

In the above equation, V is the volume in liters of sodium humate solution and M is molar concentration of sodium and sodium in the sodium humate solution.

After the above calculations had been made, the appropriate amount of cobalt sulfate was dissolved into water. A maximum solubility of cobalt sulfate at 20° C. is approximately 330 grams per liter.

To an open container of the sodium humate solution, the cobalt sulfate solution was transferred slowly by a dropping funnel. Good agitation was maintained through the addition. After the cobalt sulfate was added to the sodium humate solution, an increase in viscosity was noted. (If the viscosity increase is too much, additional water may be added to reduce the viscosity.)

After all of the cobalt sulfate was added, the solution was stirred for about a ½ hour longer. The final product was then dried over steam cone and was in the form of hard shiny friable granules.

This material may be readily ground to suitable size for catalytic processing in accordance with the invention and be used to treat caustic solutions used to scrub sour petroleum distillates.

Examples—sweetening and caustic regeneration.—To illustrate the high degree of efficiency achieved in using the catalysts of the invention to extract mercaptans from four hydrocarbon liquids and to efficiently regenerate mercaptan from such solutions in the form of readily removable disulfides, the following examples are presented.

In these particular tests, caustic solution was a 6 normal caustic solution to which was added 3 equivalents of potassium isobutyrate which acted as a solutizer. The amount of cobalt humate was 1% by weight based on the weight of the caustic solution. In all instances, the mercaptan reduction of the particular stream treated was approximately 70% or more. The regeneration of the spent solutions which contained mercaptan were extremely efficient and allowed them to be continuously reused for further extraction of mercaptans from the sour hydrocarbon streams.

All the experimental work was done in a small laboratory setup which duplicated small extraction towers of the type used in refineries. Air was injected into the system at a steady rate as indicated in the following data. To show the beneficial results obtained, the following tables are presented.

TABLE I

| Time, hours | 2 | 5 | 7 |
|---|---|---|---|
| Feed RSH (G.V.N.) | 1,070 | 1,070 | 1,070 |
| Product RSH | 293 | 387 | 320 |
| Solutizer RSH | 8,800 | 9,100 | 9,050 |
| Regeneration solutizer RSH content | 3,430 | 3,750 | 3,670 |
| Regeneration, percent | 61 | 59 | 59 |
| RSH extraction from feed, percent | 72 | 64 | 70 |
| Treat rate, vol. percent | 10 | 10 | 10 |
| Naphtha residence time, min | 24 | 24 | 24 |
| Solutizer residence time (regenerator tower), min | 120 | 120 | 120 |
| Pressure (regenerator tower), p.s.i. | 10 | 10 | 10 |
| Air rate, cc./min | 20 | 20 | 20 |
| Feed rate, cc./min | 100 | 100 | 100 |
| Extraction temperature, °F | 75 | 75 | 75 |
| Regeneration temperature, °F | 155 | 150 | 150 |
| Normality of solutizer, 1% cobalt humate in 6 N KOH-3 N KIB | 5.9 | 6.0 | 6.0 |

Observations: Run was very smooth with no operating problems. Disulfide layer forming in extraction column separated from KOH-KIB solution very well.
Feed: Depentanized Light Virgin Naphtha.

TABLE II

| Time, hours | 2 | 5 | 7 |
|---|---|---|---|
| Feed RSH (G.V.N.) | 1,065 | 1,065 | 1,065 |
| Product RSH | 280 | 329 | 321 |
| Solutizer RSH | 9,100 | 9,150 | 9,000 |
| Regenerated solutizer RSH | 3,465 | 5,235 | 3,875 |
| Regeneration, percent | 62 | 54 | 57 |
| RSH extracted from feed, percent | 73.6 | 69.2 | 69.9 |
| Treat rate, vol. percent | 10 | 10 | 10 |
| Naphtha residence time, min | 24 | 24 | 24 |
| Solutizer residence time (regenerator tower), min | 120 | 120 | 120 |
| Pressure (regenerator tower), p.s.i. | 10 | 10 | 10 |
| Air rate, cc./min | 20 | 20 | 20 |
| Feed rate, cc./min | 100 | 100 | 100 |
| Extraction temperature, °F | 75 | 78 | 75 |
| Regeneration temperature, °F | 150 | 150 | 150 |
| Normality of solutizer, 1% cobalt humate in 6 N KOH-3 N KIB | 5.9 | 5.7 | 5.9 |

Observations: Unit apparently has lined out at 70% extraction efficiency. Disulfides pose no special problem in Regenerator Tower; i.e., can be skimmed off or washed out with H.C.
Feed: Depentanized Virgin Naphtha.

TABLE III

Purpose: To check extraction efficiency of KOH-KIB solutizer in removing RSH from kerosene streams.
Solution: KOH-KIB containing 1% cobalt humate; freshly prepared.
Results:

| Time, hours | 2 | 7 |
|---|---|---|
| Feed RSH, p.p.m | 125 | 125 |
| Product RSH, p.p.m | 40 | 37 |
| Spent solutizer RSH, p.p.m | 950 | 968 |
| Regenerated solutizer RSH | 347 | 325 |
| Regeneration, percent | 63 | 66 |
| RSH extracted from feed, percent | 68 | 70 |
| Treat rate, vol. percent | 20 | 20 |
| Air rate, cc./min | 10 | 10 |
| Extraction temperature, °F | 75 | 75 |
| Regeneration temperature, °F | 155 | 155 |
| Normality of solutizer | 6.0 | 6.0 |
| Color (Saybolt) product | +30 | +30 |
| Color (Saybolt) feed | +30 | +30 |

Feed: Kerosene containing 125 p.p.m. RSH.

Tables I and II illustrate the efficiency of the invention in treating a sour naphtha; whereas Table III illustrates the benefits obtained by using the catalyst of the invention in treating a sour kerosene.

CONCLUSION

It is important to note that the invention provides an improved catalyst of superior activity that may be economically produced. The catalysts of the invention not only provide efficiency in aiding in the extraction of mercaptans from streams when used in a caustic treating oxidation process, but also allow such mercaptans to be air-oxidized to disulfides when the caustic containing mercaptans is regenerated.

One of the most important features of the invention is that the cobalt salts of the invention maintain their activity over a long period of time. The cobalt salt is not extracted by the petroleum hydrocarbons thereby providing a source of metallic contamination which is undesirable in most finished fuel-type hydrocarbon liquids. The products of the invention are extremely simple to manufacture and are economic, thereby providing an improved economy to the operators of sweetening processes of the type described.

Having thus described my invention, it is claimed as follows:

1. In the process for sweetening sour petroleum streams by contacting said streams with an aqueous catalytic caustic solution under oxidizing conditions, the improvement comprising using a humic acid salt of a heavy metal as a catalyst, said heavy metal being selected from the group consisting of iron, cobalt, nickel, ruthenium, rhodium, palladium, osmium, iridium, platinum, zinc, copper, bismuth, lead, barium, magnesium, calcium or strontium.

2. A process as described in claim 1 wherein said heavy metal is cobalt.

3. A process as described in claim 2 wherein said humic acid is derived from leonardite.

4. A process as described in claim 3 wherein said leonardite has been acid washed and neutralized prior to the formation of cobalt humate.

References Cited

UNITED STATES PATENTS

| | | | |
|---|---|---|---|
| 2,516,837 | 8/1950 | Happel et al. | 208—234 |
| 2,744,854 | 5/1956 | Urban, Jr. | 208—191 |
| 2,651,595 | 9/1953 | Mouthrop | 208—204 |
| 3,097,158 | 7/1963 | Gleim | 208—204 |
| 2,229,278 | 1/1941 | Craig | 208—189 |
| 2,425,776 | 8/1947 | Adams et al. | 208—234 |
| 2,468,701 | 4/1949 | Cauley | 208—235 |
| 2,560,178 | 7/1951 | Krause et al. | 208—234 |
| 2,954,340 | 9/1960 | Hunter | 208—230 |
| 3,252,892 | 5/1966 | Gleim | 208—206 |
| 3,408,287 | 10/1968 | Urban et al. | 208—204 |

OTHER REFERENCES

Chemical Abstracts (1961), Orlov, D. S., and Nesterenko, N. V., Formation of Humates of Cobalt, Nickel, Copper and Zinc.

Nanch, Doklady Vysshei Shkoly, Biol. Nauki, 1960, No. 3, 195–8.

Yabroff, D. L., and Border, L. E., The Solutizer Process, Refiner, May 1939, vol. 18, No. 5, pp. 171–176, 203.

PAUL M. COUGHLAN, JR., Primary Examiner

G. J. CRASANAKIS, Assistant Examiner

U.S. Cl. X.R.

208—191, 197, 231